United States Patent
Muszynski

(10) Patent No.: US 6,304,045 B1
(45) Date of Patent: Oct. 16, 2001

(54) COMMUTATION OF SPLIT-PHASE WINDING BRUSHLESS DC MOTOR

(75) Inventor: Jerzy Muszynski, London (CA)

(73) Assignee: Siemens Automotive Inc., Mississauga (CA)

( * ) Notice: Subject to any disclaimer, the term of this patent is extended or adjusted under 35 U.S.C. 154(b) by 0 days.

(21) Appl. No.: 09/146,886

(22) Filed: Sep. 3, 1998

(51) Int. Cl.[7] .................................................. H02P 5/00
(52) U.S. Cl. .......................................... 318/439; 388/815
(58) Field of Search .................................. 318/254, 439, 318/138, 701; 388/805, 815, 821; 310/179, 180, 184

(56) References Cited

U.S. PATENT DOCUMENTS

| | | | |
|---|---|---|---|
| 3,663,877 | 5/1972 | Clark ..................... | 318/254 |
| 3,851,231 | * 11/1974 | Eastham et al. ......... | 318/135 |
| 3,930,190 | * 12/1975 | Liska ..................... | 318/254 |
| 3,931,553 | 1/1976 | Stich et al. ............. | 318/138 |
| 4,075,543 | * 2/1978 | Uyen ...................... | 318/224 |
| 4,092,572 | 5/1978 | Murata ................... | 318/138 |
| 4,484,115 | 11/1984 | Takahashi .............. | 318/254 |
| 4,495,450 | 1/1985 | Tokizaki et al. ........ | 318/138 |
| 4,528,485 | 7/1985 | Boyd, Jr. ................ | 318/138 |
| 4,654,566 | 3/1987 | Erdman .................. | 318/254 |
| 4,746,844 | 5/1988 | MacKelvie et al. ..... | 318/254 |
| 4,758,768 | 7/1988 | Hendricks et al. ...... | 318/254 |
| 4,882,524 | * 11/1989 | Lee ........................ | 318/254 |
| 5,140,246 | * 8/1992 | Rarick .................... | 318/779 |
| 5,204,604 | 4/1993 | Radun .................... | 318/701 |
| 5,216,339 | * 6/1993 | Skybyk .................. | 318/254 |
| 5,216,343 | 6/1993 | Genheimer et al. ..... | 318/568.18 |
| 5,221,880 | 6/1993 | Bartholow et al. ..... | 318/139 |
| 5,350,987 | * 9/1994 | Ueki ...................... | 318/466 |
| 5,602,452 | 2/1997 | Underhill .............. | 318/439 |
| 5,652,493 | * 7/1997 | Hendershot, Jr. ...... | 318/701 |

* cited by examiner

*Primary Examiner*—Jonathan Salata

(57) ABSTRACT

A brushless DC motor utilizes alternating current including a plurality of phases of alternating current. Each phase of the plurality of phases is supplied to a respective phase winding group. Each phase winding group is wound on a stator, and each phase of the plurality of phases of alternating current is split into a plurality of subphases of alternating current subsections. Each phase winding group includes a plurality of phase winding subsections and each phase winding subsection of the plurality of phase winding subsections is supplied by a subphase of a plurality of the plurality subphases of alternating current. A means for switching current so as to conduct the alternating current through at least one of the plurality of phase winding subsections is also included.

28 Claims, 6 Drawing Sheets

| COIL ANGULAR DISPLACEMENT || PHASE CONNECTION |
|---|---|---|
| FROM [DEGREES] | TO [DEGREES] | |
| 0 | 60 | AB |
| 60 | 120 | AC |
| 120 | 180 | BC |
| 180 | 240 | BA |
| 240 | 300 | CA |
| 300 | 360 | CB |

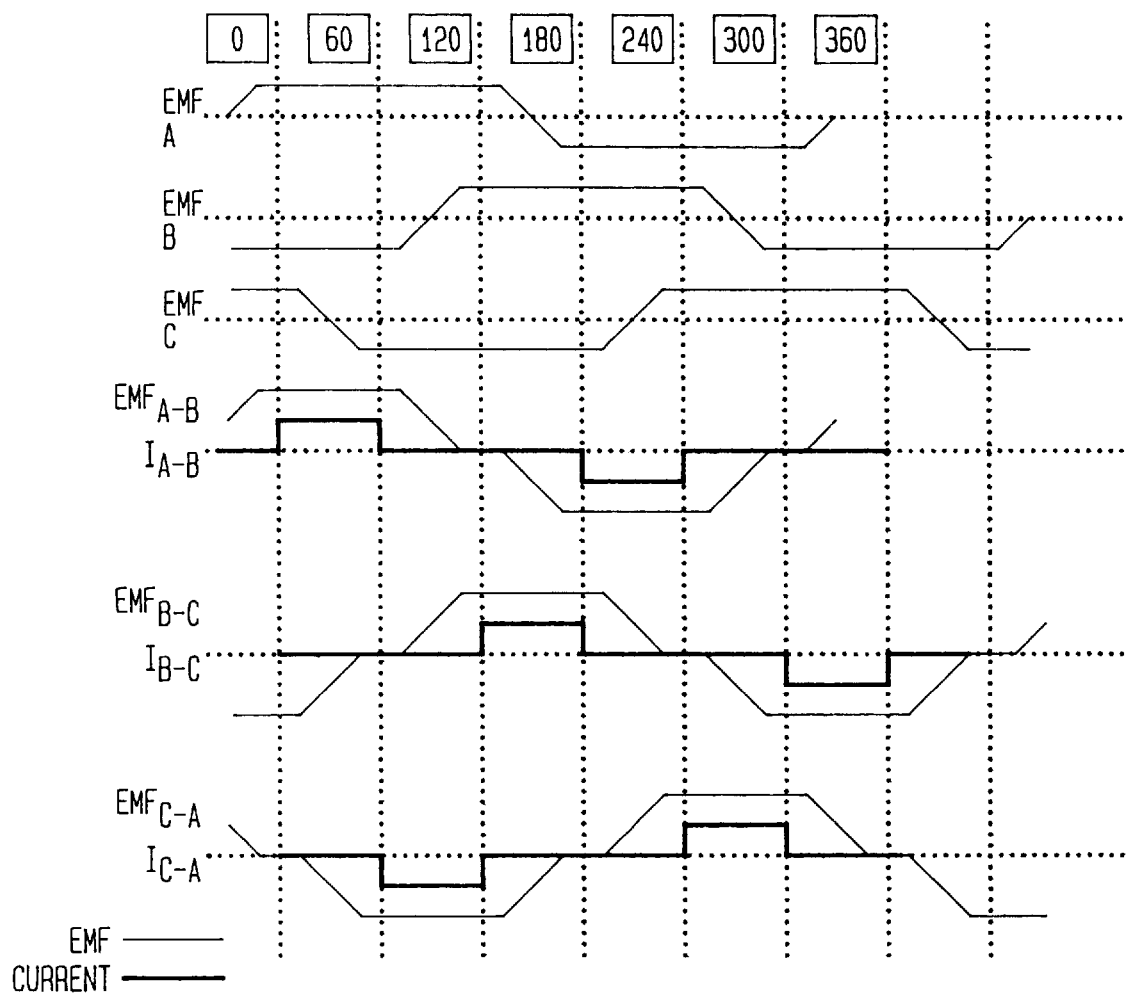

—— CURRENT AT LOW SPEED
----- CURRENT AT FULL SPEED

COMMUTATION OF SPLIT-PHASE WINDING BRUSHLESS DC MOTOR

BACKGROUND OF THE INVENTION

1. Field of the Invention

This invention relates to polyphase variable speed "brushless direct current (DC)" motors and, in particular, to speed controls for such motors.

2. Description of the Related Art

Brushless DC machines are well known in the art. A brushless DC machine is a sychronous machine, which is powered by alternating current, operated in such a way as to behave like a DC machine. Input power from a DC source is converted into alternating currents which are supplied to armature windings on a stator. Sensors signal the position of the rotor, on which magnets are located, to electronics which control switching elements converting the input DC power to polyphase alternating currents. The frequency and phase angle of the stator currents are controlled such that a constant angular displacement exists between the poles of the rotating stator field and the field poles of the rotor. Such a constant angular displacement also exists in a DC machine. However, in a DC machine the field windings are on the stator and the armature windings are on the rotor.

Typically, the polyphase alternating currents are three-phase currents, the phases being displaced from one another by a phase angle of 120°. Each phase of the three phases of alternating current supplies one of three phase windings found on the stator. The alternating current supplied to the phase windings can be either bipolar or unipolar. Bipolar alternating current can be a full rectangular wave or sinusoidal alternating current and unipolar alternating current is usually a half rectangular wave alternating current, the current varying from zero to a certain magnitude with no current reversal. A typical three phase winding for a three phase bipolar brushless DC motor in a star configuration is shown in FIG. 1. Typical examples of bipolar and unipolar alternating current are shown in FIGS. 1a and 1b, respectively.

In the configuration shown in FIG. 1, two phase windings can be connected to the power supply through the half H-bridge switching system comprised of at least one half H-bridge switching arrangement 2. For example, to turn phase windings A and B on, switches Q1 and Q4 would be turned on. To apply current in the opposite direction through phase windings A and B, switches Q3 and Q2 would be turned on. The remaining switches would be left in the open position. $V_S$ stands for supply voltage and GND stands for ground in FIG. 1.

The current flow in each winding must be synchronized to change direction simultaneously with the change in direction of the back electromotive force (EMF) developed by the phase winding such that the current flow in each winding opposes the back EMF developed by each phase winding. FIG. 2 illustrates the variation over time of the back EMF for each phase winding and the combined variation of back EMF and current over time for any two of the three phase windings shown in FIG. 1.

Current always flows through two phase windings when the combined phase to phase back EMF is at its maximum magnitude, shown in FIG. 2 by the flat portion of a trapezoid. The sequence in which all three phases are energized is shown in FIG. 2a. FIG. 2a presents one electrical cycle that is continuously repeated as the motor rotates. When the back EMF is reversed in a pair of coils, the current must reverse its direction as well. This is effected by turning on corresponding switches.

When operating in the above mode, the motor will run at full speed, determined by the applied load. One of the important features of brushless DC motors is the ability to change the operating speed continuously. Speed control has been achieved by various methods including linear speed control, pulse width modulation (PWM), block commutation, and by applying resonant converters.

Speed variation using linear speed control is obtained by operating switches, for example, metal-oxide semiconductor field effect transistors (MOSFETs) in their linear operation regions (as variable resistors). The MOSFETs' resistance determines the magnitude of current passed through the phase coil. This type of control can only be utilized for relatively low levels of current due to the MOSFET heating effect.

Speed variation using PWM is obtained by chopping the phase current. The PWM frequency is much higher then the EMF waveform frequency. In this case, the current pulses of a constant frequency are varied in width, thus changing the average value of the current. MOSFETs can act as switches which are either fully turned on or fully turned off. When the MOSFETs are turned off, the phase current is chopped. The pulse width of 100% corresponds to full speed operation. The lower the pulse width, the lower the average phase current and speed. A pulse width of 60% means that the MOSFET is turned on for 60% of the pulse duration time, and is turned off for the remaining 40% of the time. This type of control, although more efficient than linear speed control, requires a snubber circuit comprising a power resistor (dissipating substantial amounts of heat) and a capacitor. It can also generate substantial amounts of radio frequency interference due to fast current transition rates.

Speed variation using block commutation is obtained by changing the duration of the phase current during each conduction period, see FIG. 3. In this type of control, speed is a function of time during which the relevant phase MOSFETs are turned on for each conduction period, a conduction period being, for example, 60 degrees. In such a case, the phase duration would be in the range of approximately 20 degrees for low speed, 40 degrees for medium speed, and 60 degrees for full speed operation. The main advantage of this method is a simple drive circuit, with relatively high efficiency. The disadvantage is the fact that at low speeds, the magnitude of current pulses can become high. As a result, this method has been used only over small ranges of speed.

Speed control using resonant converters is obtained using various control topologies in which resonant components such as inductors and capacitors are used to control the energy flow. This is an emerging method of speed control by which very low thermal losses and reduced radio frequency interference (RFI) can be obtained. Added components may limit this technology in space and cost sensitive applications.

SUMMARY OF THE INVENTION

The present invention relates to an apparatus which utilizes the methods of block commutation and linear speed control to achieve brushless DC motor speed control, while minimizing the disadvantages of those methods.

The brushless DC motor of the present invention utilizes alternating currents comprising a plurality of phases, of alternating current each of the plurality of phases being supplied to a phase winding group, each phase winding group being wound on a stator included in the brushless DC motor. Each phase of the plurality of phases of alternating current is split into a plurality of subphases of alternating current, and each phase winding croup comprises a plurality of phase winding subsections. Each phase winding subjection of the plurality of phase winding subjections is supplied by a subphase of a plurality of the plurality of subphases of alternating current. The brushless DC motor further comprises means for switching current so as to conduct the current through at least one of the plurality of phase winding subsections. The motor is operative at a plurality of motor operating speeds, each motor operating speed being determined by a current path through at least one of the plurality of phase winding subsections different from current paths corresponding to those of the plurality of motor operating speeds other than the motor operating speed corresponding to the current path.

The means for switching currents can comprise at least one half H-bridge switching arrangement, and the plurality of phases can be three in number. The alternating currents can be bipolar or unipolar. Block commutation or linear speed control can be used to vary motor speed between a first speed of said plurality of motor operating speeds and a second speed of said plurality of motor operating speeds.

BRIEF DESCRIPTION OF DRAWINGS

FIG. 1 is a schematic drawing of the three-phase brushless DC motor bipolar winding configuration;

FIG. 2 illustrates graphical displays of back electromotive force and current waveforms in the three-phase bipolar winding configuration;

DESCRIPTION OF THE PREFERRED EMBODIMENTS

Figure 4:
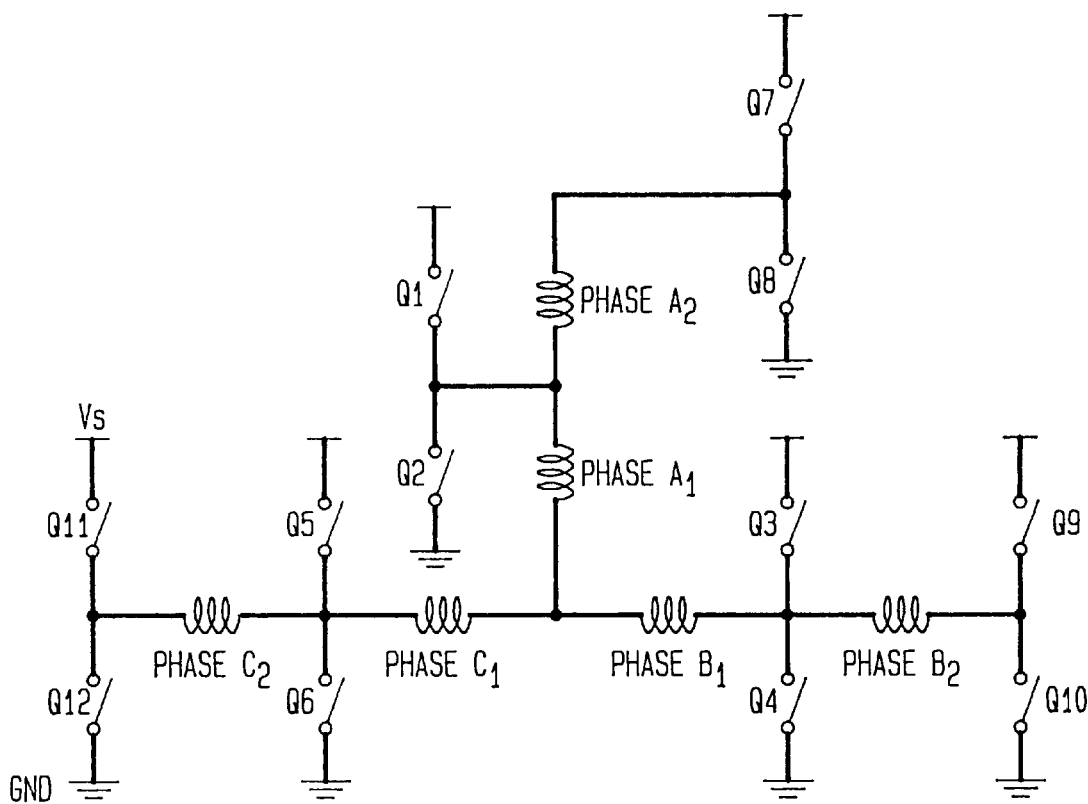
FIG. 4 is a schematic diagram of the brushless DC motor split-phase bipolar winding configuration according to the invention.

Referring initially to FIG. 4, there is disclosed a schematic diagram of a first embodiment of the invention wherein a a split-phase bipolar winding configuration is incorporated into a brushless DC motor. Each phase winding includes at least two winding subsections. In FIG. 4, phase winding group A has been split into two subsections, namely, phase winding subsection $A_1$, and phase winding subsection $A_2$. Phase winding subsection B has been split into phase winding subsection $B_1$ and phase winding subsection $B_2$. Likewise, phase C has been split into phase winding subsection $C_1$ and phase winding subsection $C_2$. Phase winding subsection $A_1$, $B_1$, and $C_1$ constitute a main set of windings, and phase winding subsection $A_2$, $B_2$, and $C_2$ constitute a supplementary set of windings.

In addition to the supplementary winding, three half H-bridge switches, Q7–Q12, are introduced to perform the current switching functions. A typical motor which incorporates this winding configuration will have three distinct speed-torque curves as shown in FIG. 5.

Figure 5:
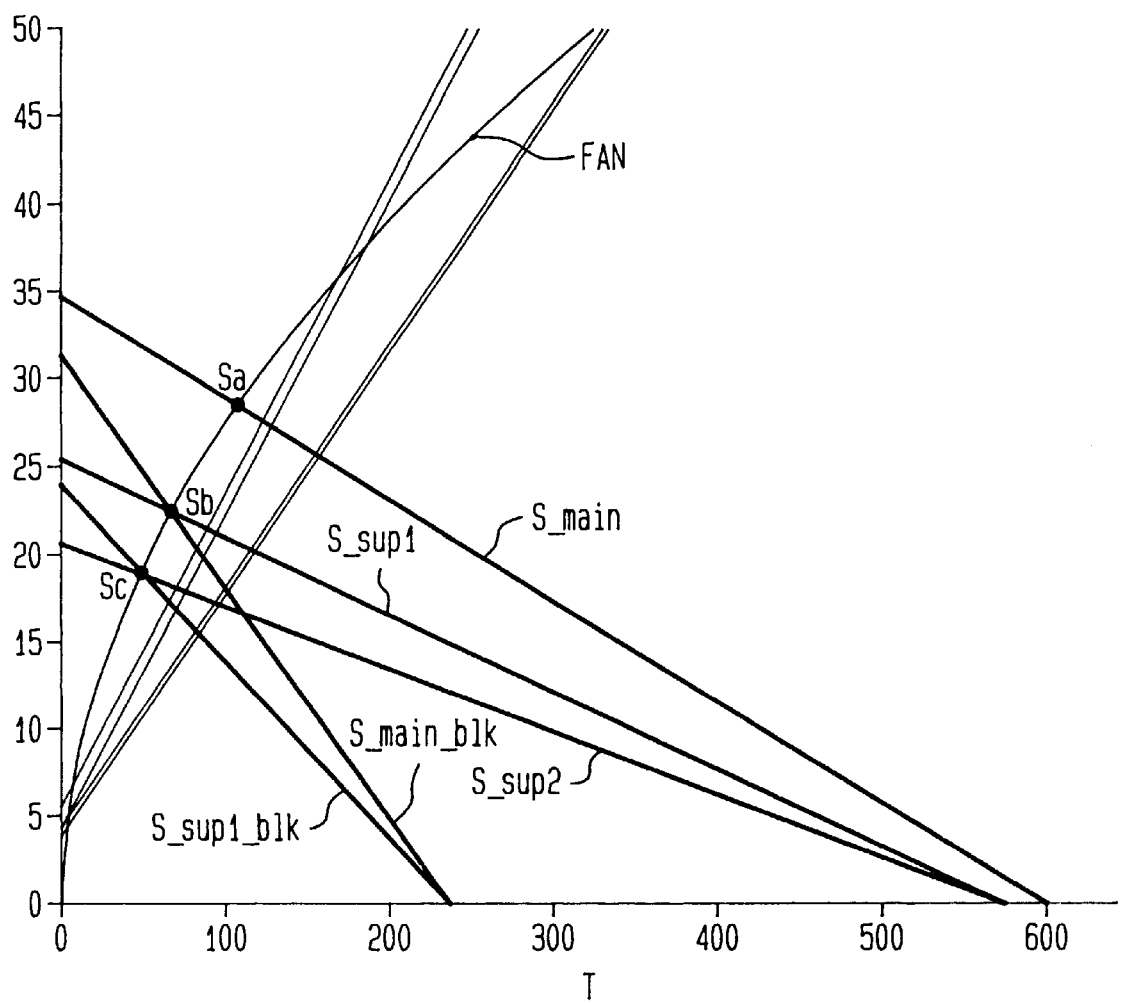
FIG. 5 illustrates the speed-torque curves for the brushless DC motor split-phase bipolar winding configuration according to the invention.

Referring now to FIG. 5, the "S_main" line represents the base speed-torque line of the motor when only the main winding is in operation, for example, when phase winding subsections $A_1$ and $B_1$ are conducting current. The line "S_sup1" represents the speed-torque line of the motor when the main winding, and one supplementary winding are working together, for example, when phases $A_1$, $A_2$, and $B_1$ are working together. The line "S_sup2" represents the speed-torque line of the motor when the main winding and both supplementary windings are working together, for example, when phase winding subsections A, $A_2$, $B_1$ and $B_2$ are working together. The crossing points of the speed-torque lines and the fan curve will determine the motor operating speed for each winding configuration. These crossing points correspond to three distinct speed levels: $S_a$, $S_b$, and $S_c$. In order to change the motor speed between these points, the block commutation method is used.

Figure 1A:
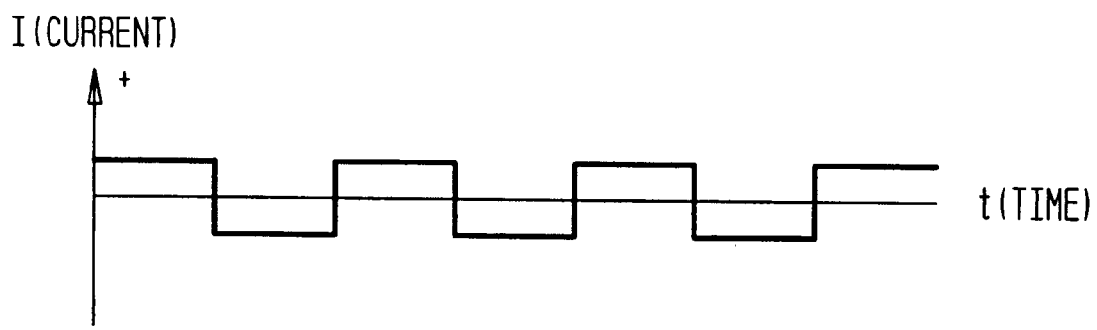
FIG. 1a is a schematic drawing of a typical example of bipolar alternating current.
Figure 1B:
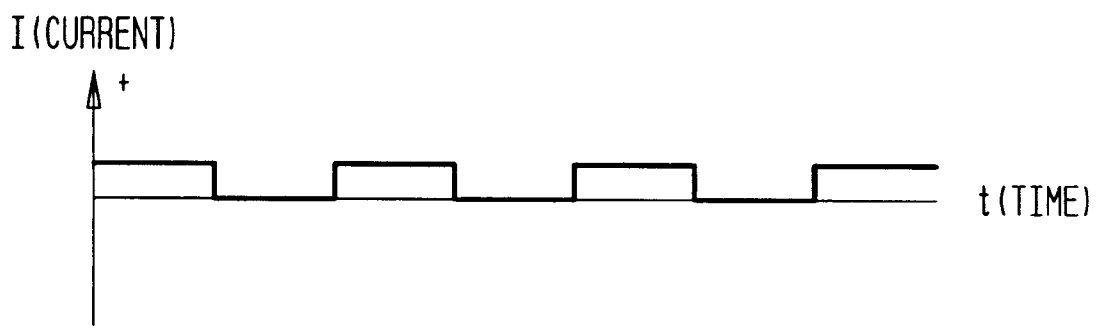
FIG. 1b is a schematic drawing of a typical example of unipolar alternating current.
Figures 1C, 2A:
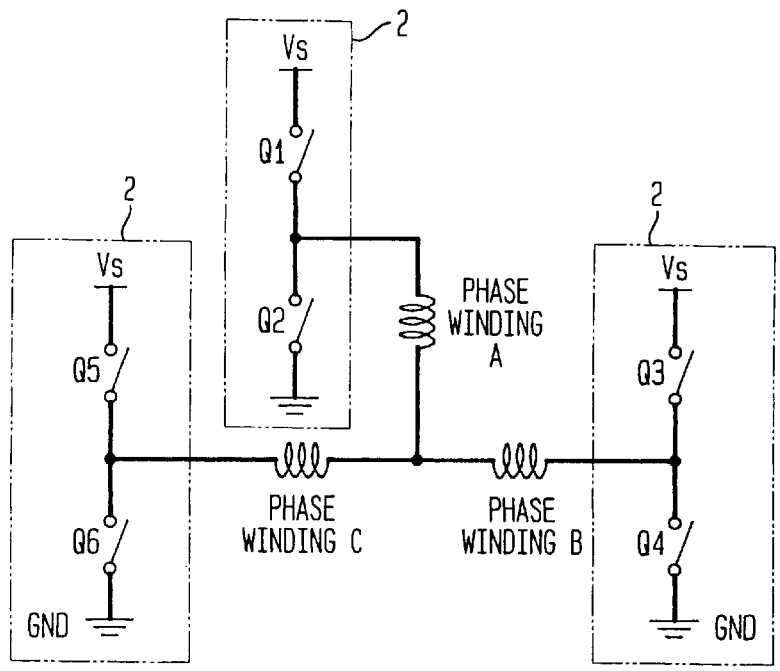
FIG. 2a shows the sequence and duration for which the phases of the three-phase bipolar motor are energized for full speed operation during one complete electrical cycle.
Figure 3:
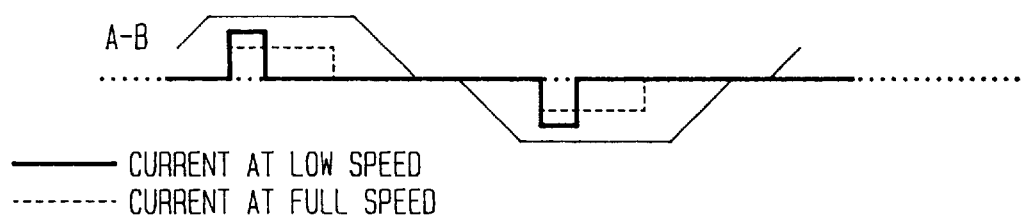
FIG. 3 is a graph showing current pulse change during block commutation.

As described hereinabove, the block commutation method is an effective method to control the speed of the motor at certain predetermined speed ranges of the motor. For example, the speed change in the range of $S_a$ to $S_b$ is obtained by shortening the duration of the current blocks, see FIG. 3. By doing this, the base speed-torque curve is gradually rotated clockwise as the stall torque is decreased. When the intersection of the fan curve and the base curve reaches the $S_b$ point, the base speed-torque line will have a position indicated in FIG. 5 as the "S_main_blk" line. At that point, the winding configuration is modified to include one supplementary winding. For that configuration as described above, the corresponding speed torque line is "S_sup1". At this point, the block commutation is disabled, and the motor operates as though at full speed operation.

In order to decrease the speed from point to $S_b$ to $S_c$, block commutation is again implemented. The base line for the speed change is the "S_sup1" line. At the end of that speed change, point $S_c$, the speed-torque line will be represented by "S_sup1_blk". At that point, the winding configuration is again modified to include two supplementary windings. As described above, the corresponding speed torque line is "S_sup2". At this point, block commutation is disabled again and the motor once again operates as though at full speed operation. Below that speed level, the block commutation method or linear speed control can be used.

In addition to speed-torque curves, FIG. 5 shows the corresponding current curves. In general, for the brushless DC motor split-phase bipolar winding configuration, the block commutation method of speed control is more efficient above one-half of the maximum speed of the motor and the linear speed control method is more effective below one-half of the maximum speed of the motor. If block commutation is used at low motor speeds, the magnitude of current pulses become very high due to low back EMF, and the current pulses in turn cause torque ripples, and can be devastating to electronic switches.

More than one set of supplementary phases can be used according to the invention. For example, different numbers of turns, as well as different wire gages, can be implemented. Other methods beside block commutation can be utilized to obtain a variable speed control.

Figure 6:
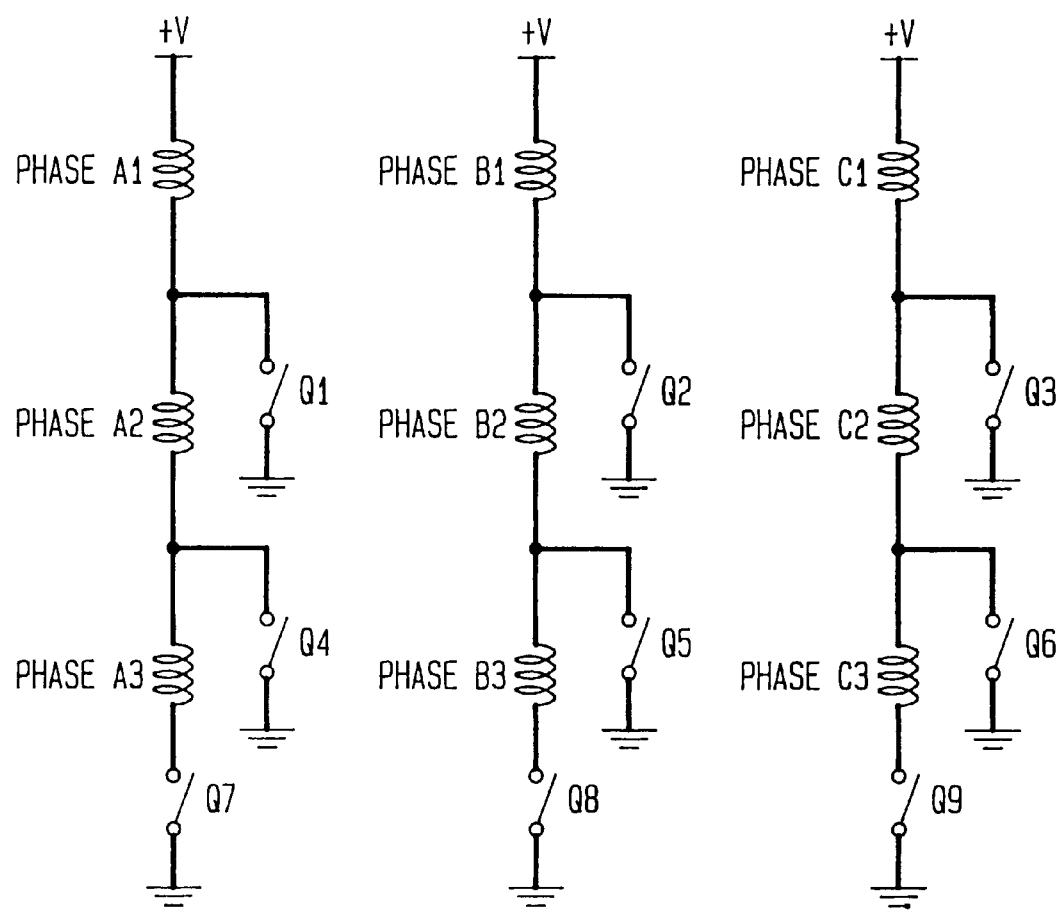
FIG. 6 is a schematic diagram of the brushless DC motor split-phase unipolar winding configuration according to the invention.

A second embodiment of the invention is shown in FIG. 6 wherein a brushless DC motor split-phase unipolar winding configuration is shown. In this embodiment, winding group is split in three phase winding subsections. The motor can be made operational at three different speed levels. The first speed level is obtained by switching only Q1, Q2, and Q3 transistors (i.e. switches). The second, lower speed level is obtained by switching only Q4, Q5, and Q6 transistors. The third, lower speed level is obtained by switching Q7, Q8, and Q9 transistors. To obtain a continuous speed control, a block commutation and/or a linear speed control method may be implemented.

Some advantages of the split-phase speed control method over the existing methods of speed control are: (1) radio frequency interference levels lower than those generated by PWM methods, (2) current ripple levels lower than those present using traditional block commutation, (3) the amount of heat losses at high and medium speed operation are lower than those generated by linear speed control or PWM control, (4) hardware and software design is simpler than that needed for PWM control, (5) the split-phase speed control method is a low cost solution when compared to PWM control, (6) the hardware necessary to implement split-phase speed control is of a small physical size, (7) split-phase speed control enables high power density and high power capability, (8) high efficiency is achieved at high and medium speed ranges (no power snubbing circuitry is necessary), (9) increased reliability of motor start-up is achieved when using sensorless commutation, (10) motor starting torque is increased, and (11) there is a minimal effect of excessive levels of supply voltage on internal power losses.

What is claimed is:

1. A brushless DC motor utilizing alternating current which comprises a plurality of phases of said alternating current, each phase of said plurality of phases of said alternating current being supplied to a respective phase winding group, each said phase winding group being wound on a stator of said brushless DC motor, each phase of said plurality of phases of said alternating current being split into a plurality of subphases of said alternating current, each said phase winding group comprising a plurality of phase winding subsections connected in series, each phase winding subsection of said plurality of phase winding subsections being supplied by a subphase of a plurality of said plurality of subphases of said alternating current, said brushless DC motor comprising means for switching current so as to conduct the alternating current through at least one of said plurality of phase winding subsections said brushless DC motor being operative in three motor operating speeds.

2. A brushless DC motor as claimed in claim 1, wherein each motor operating speed is determined by a current path through at least one of said plurality of phase winding subsections, said current path being different from current paths corresponding to those of said three motor operating speeds other than said motor operating speed corresponding to said current path.

3. A brushless DC motor as claimed in claim 1, wherein said means for switching currents comprises at least one half H-bridge switching arrangement.

4. A brushless DC motor as claimed in claim 1, wherein said plurality of phases of said alternating current are three in number.

5. A brushless DC motor as claimed in claim 1, wherein said alternating current is bipolar.

6. A brushless DC motor as claimed in claim 1, wherein said alternating current is unipolar.

7. A brushless DC motor as claimed in claim 2, further comprising a semiconductor switching controller for switching current paths between at least two differing phase winding subsections, and a block commutation controller, said switching controller and said block commutation controller being for operation in coordination to vary motor speed between a first speed of said three motor operating speeds and a second speed of said three motor operating speeds.

8. A brushless DC motor as claimed in claim 2, further comprising a semiconductor switching controller for switching current paths between at least two differing phase winding subsections, and a linear speed controller, said linear speed controller and said switching controller being for operation in coordination to vary motor speed between a first speed of said three motor operating speeds and a second speed of said three motor operating speeds.

9. A brushless DC motor as claimed in claim 7, wherein said first speed and said second speed are greater than one-half of a maximum speed of said brushless DC motor.

10. A brushless DC motor as claimed in claim 8, wherein said first speed and said second speed are less than one-half of a maximum speed of said brushless DC motor.

11. A plurality of phase winding groups for a brushless DC motor which utilizes alternating current comprising a plurality of phases of said alternating current, each phase of said plurality of phases of said alternating current being split into a plurality of subphases of said alternating current, each phase winding group of said plurality of phase winding groups being supplied by a respective phase of said plurality of phases of said alternating current, each phase winding group of said plurality of phase winding groups being wound on a stator of said brushless DC motor and comprising a plurality of phase winding subsections connected in series, each phase winding subsection of said plurality of phase winding subsections being supplied by a subphase of a plurality of said plurality of subphases of said alternating current, said brushless DC motor being operative in three motor operating speeds.

12. A brushless DC motor as claimed in claim 11, wherein said plurality of phases of said alternating current are three in number.

13. A brushless DC motor as claimed in claim 11, wherein said alternating current is bipolar.

14. A brushless DC motor as claimed in claim 11, wherein said alternating current is unipolar.

15. A brushless DC motor utilizing alternating current which comprises a plurality of phases of said alternating current, each phase of said plurality of phases of said alternating current being supplied to a respective phase winding group, each said phase winding group being wound on a stator of said brushless DC motor, each phase of said plurality of phases of said alternating current being split into a plurality of subphases of said alternating current, each said phase winding group comprising a plurality of phase winding subsections connected in series, each phase winding subsection of said plurality of phase winding subsections being supplied by a subphase of a plurality of said plurality of subphases of said alternating current, said brushless DC motor comprising means for switching current so as to conduct the alternating current through at least one of said plurality of phase winding subsections, said brushless DC motor being operative in three motor operating speeds.

16. A brushless DC motor as claimed in claim 15, wherein each motor operating speed is determined by a current path through at least one of said plurality of phase winding subsections, said current path being different from current paths corresponding to those of said three motor operating speeds other than said motor operating speed corresponding to said current path.

17. A brushless DC motor as claimed in claim 15, wherein said means for switching currents comprises at least one half H-bridge switching arrangement.

18. A brushless DC motor as claimed in claim 15, wherein said plurality of phases of said alternating current are three in number.

19. A brushless DC motor as claimed in claim 15, wherein said alternating current is bipolar.

20. A brushless DC motor as claimed in claim 15, wherein said alternating current is unipolar.

21. A brushless DC motor as claimed in claim 16, further comprising a semiconductor switching controller for switching current paths between at least two differing phase winding subsections, and a block commutation controller, said switching controller and said block commutation controller being for operation in coordination to vary motor speed between a first speed of said three motor operating speeds and a second speed of said three motor operating speeds.

22. A brushless DC motor as claimed in claim 16, further comprising a semiconductor switching controller for switching current paths between at least two differing phase winding subsections, and a linear speed controller, said switching controller and said linear speed controller being for operation in coordination to vary motor speed between a first speed of said three motor operating speeds and a second speed of said three motor operating speeds.

23. A brushless DC motor as claimed in claim 21, wherein said first speed and said second speed are greater than one-half of a maximum speed of said brushless DC motor.

24. A brushless DC motor as claimed in claim 22, wherein said first speed and said second speed are less than one-half of a maximum speed of said brushless DC motor.

25. A plurality of phase winding groups for a brushless DC motor which utilizes alternating current comprising a plurality of phases of said alternating current, each phase of said plurality of phases of said alternating current being split into a plurality of subphases of said alternating current, each phase winding group of said plurality of phase winding groups being supplied by a respective phase of said plurality of phases of said alternating current, each phase winding group of said plurality of phase winding groups being wound on a stator of said brushless DC motor and comprising a plurality of phase winding subsections connected in series, each phase winding subsection of said plurality of phase winding subsections being supplied by a subphase of a plurality of said plurality of subphases of said alternating current, said brushless DC motor being operative in three motor operating speeds.

26. A brushless DC motor as claimed in claim 25, wherein said plurality of phases of said alternating current are three in number.

27. A brushless DC motor as claimed in claim 25, wherein said alternating current is bipolar.

28. A brushless DC motor as claimed in claim 25, wherein said alternating current is unipolar.

* * * * *